Figure 1:
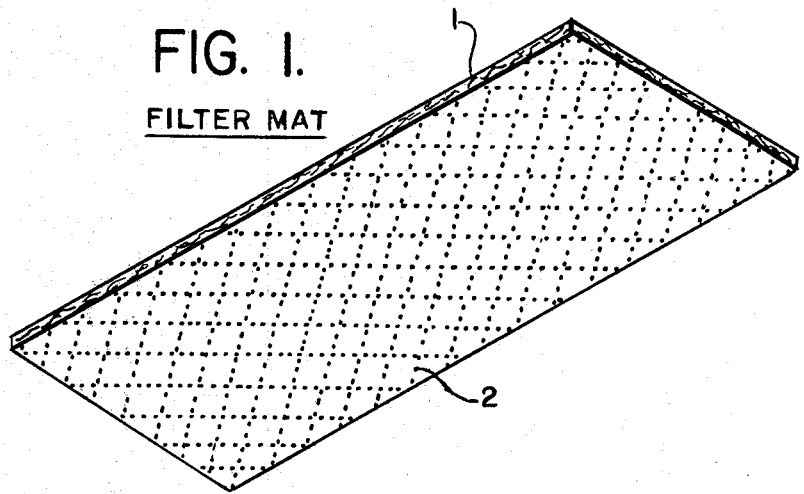

United States Patent [19]

Schultheiss et al.

[11] 4,336,038
[45] Jun. 22, 1982

[54] FILTER MAT

[75] Inventors: Wolfram Schultheiss, Birkenau; Harald Hoffmann, Dossenheim, both of Fed. Rep. of Germany

[73] Assignee: Firma Carl Freudenberg, Hohnerweg, Fed. Rep. of Germany

[21] Appl. No.: 182,175

[22] Filed: Aug. 28, 1980

Related U.S. Application Data

[63] Continuation-in-part of Ser. No. 19,965, Mar. 12, 1979, abandoned.

[30] Foreign Application Priority Data

Mar. 25, 1978 [DE] Fed. Rep. of Germany ... 7809170[U]

[51] Int. Cl.³ .............................................. B01D 46/10
[52] U.S. Cl. .............................. 55/274; 55/DIG. 34; 55/DIG. 36; 116/DIG. 25; 116/DIG. 41; 126/299 R
[58] Field of Search ................. 55/274, 275, DIG. 34, 55/DIG. 36; 116/DIG. 25, DIG. 41; 126/299 R

[56] References Cited

U.S. PATENT DOCUMENTS

| | | | |
|---|---|---|---|
| 2,249,867 | 7/1941 | Snelling | 55/275 X |
| 3,171,726 | 3/1965 | Roney et al. | 55/275 |
| 3,505,783 | 4/1970 | Graham | 55/275 X |
| 3,527,027 | 9/1970 | Knight et al. | 55/275 |
| 3,705,480 | 12/1972 | Wireman | 55/275 |
| 3,891,417 | 6/1975 | Wade | 55/274 |
| 4,050,291 | 9/1977 | Nelson | 55/274 X |
| 4,130,487 | 12/1978 | Hunter et al. | 55/274 X |

FOREIGN PATENT DOCUMENTS 2514735 10/1976 Fed. Rep. of Germany ........ 55/274

Primary Examiner—Kathleen J. Prunner
Attorney, Agent, or Firm—Sprung, Horn, Kramer & Woods

[57] ABSTRACT

A fibrous filter mat of which all or a part of the fibers are coated totally or at least in part with a mixture of at least two dye components which are insoluble in one another, one of said components being fat- and/or oil-soluble and of a color which contrasts with that of the fiber blend and/or of the other component, the other component being fat- and/or oil-insoluble. The mat is especially suited for kitchen exhaust hoods since entrapment of fats and oils causes a color change as the oil-soluble dye dissolves and spreads out.

6 Claims, 3 Drawing Figures

FILTER MAT

FILTER MAT

This is a continuation-in-part of Application Ser. No. 19,965, filed Mar. 12, 1979, now abandoned.

The invention relates to a filter mat for the separation of cooking-vapor aerosols, particularly in kitchen hoods with electric-motor exhaust-fan drive.

The longer the filter mat in a kitchen hood has been in use, the more grease and cooking-vapor particles it will have retained, the higher the pressure drop through the filter mat will be, and the lower the draft of the hood, depending on the extent of plugging. Often it is not possible to tell by looking at the filter mat that it is blocked by the grease which it has removed, and the reduced draft is not particularly noticed, with the result that an excessive amount of grease may accumulate over the cooking position and, in case of a fire, promote spread of the fire.

The invention has as its object to improve a kitchen-vapor filter mat in such a way that the degree to which it is plugged with grease is externally indicated so that it will be clearly visible and prompt the user of the hood to discard the grease-loaded filter mat and replace it with a new one.

This object is accomplished through a filter mat consisting of synthetic and/or natural fibers in which all or some of the fibers are coated at least in part with a mixture of at least two components which are insoluble in each other and one of which is fat- and/or oil-soluble and of a color which contrasts with that of the fiber blend and/or of the other component which is fat- and/or oil-insoluble.

Thus the invention utilizes the fact that most of the cooking vapors to which filters of this type are exposed are fat or oil aerosols, and hence hydrocarbon compounds. The color of the mixture used for the coating is initially determined largely by the component which is insoluble in these compounds. After being exposed to said aerosols, the color of the dye-component mixture is influenced increasingly by the color of the fat- and/or oil-soluble component, the change manifesting itself particularly clearly when the two components are of contrasting colors.

In one particular variant, the dye mixture is uniformly distributed over the fibers covering the intake side. A corresponding embodiment may be produced, for example, by covering the intake side of the filter mat with a nonwoven fabric which is impregnated throughout with a solution or dispersion of the dye mixture.

With a view to achieving an attractive appearance, it has proved advantageous to distribute the mixture nonuniformly over the fibers covering the intake side, for example, in the form of a geometric pattern.

In one particular embodiment, the pattern is made up of dots and/or lines of a width of about 0.5 to 4 mm, and preferably of about 1 mm. The pattern is preferably a striped or checkered pattern in which the parallel lines are spaced about 5 to 40 mm, and preferably about 20 mm, apart. If desired, the color intensity of the lines may vary over their length. However, any other desired patterns, and particularly letters, writing or stenciled figures, may be applied in like manner, that is to say, nonuniformly.

Application of the pattern is fairly simple and may be done by known printing methods. Apart from the improved surface design which it makes possible, such an embodiment offers the special advantage that when a certain fat-loading level is reached in the filter mat the fat- and oil-soluble component will start bleeding into the unprinted spaces of the pattern. Even an untrained user of kitchen hoods will thus be alerted that the filtering action of the mat is exhausted and the mat will have to be replaced.

In a further advantageous embodiment, the mixture used contains a size and/or a bonding agent which will promote the migration of separated fat. A side effect regarded as beneficial is that the preferential concentration of the mixture on the intake side of the filter mat result in added strength with respect to mechanical damage. This is an advantage from the standpoint of safe handling.

The filter mats used are preferably made of planar nonwoven-fabric filter materials. However, the invention is also applicable to filter mats of woven or knitted fabric or of a combination of one or more of these materials with foamed-plastic materials.

Figure 2:
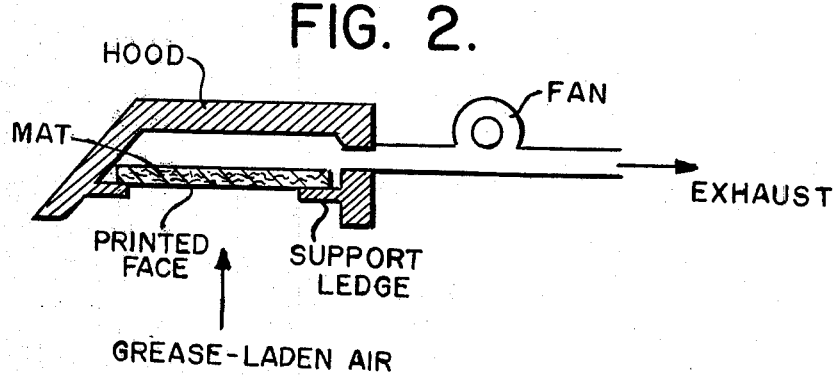
Figure 3:
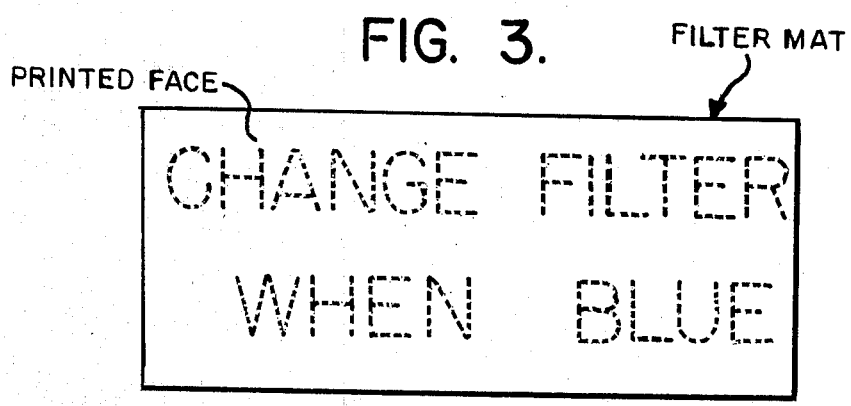

The invention will be further described with reference to the accompanying drawing wherein FIG. 1 is a perspective view of a filter mat in accordance with the invention, FIG. 2 is a schematic sectional view through a hood carrying the filter of FIG. 1, and FIG. 3 is a plan view of a filter in which the dye component mixture is printed in the form of a message instructing the user when to change the filter.

Referring now more particularly to the mat of FIG. 1, the underside of a filter mat 1 is imprinted with a grid 2 of intersecting dotted lines.

The invention will now be explained in greater detail in the examples which follow.

EXAMPLE 1

From a fiber blend of 40% 12 mm, 17 dtex viscose rayon staple fiber, 25% 18 mm, 6.7 dtex polyacrylonitrile staple, and 35% cellulose wood pulp, a web is formed by wet laying and then impregnated with a synthetic-resin-based bonding agent. The nonwoven fabric so produced weighs 150 g/m$^2$, is from 1 to 2 mm thick and has a permeability to air of 1,100 l/s$\times$m$^2$, measured at a pressure difference of 0.5 mbar in accordance with DIN 53,887.

A square grid of lines 1 mm wide and spaced 35 mm apart was then imprinted on one surface of the nonwoven fabric. This was done with an aqueous print paste containing 1.6% by weight of polyacrylic acid and 1.2% of a dyestuff mixture itself made up as follows:

| | |
|---|---|
| (a) Sudanred 7 B or Ceresred 7 B (Disazodye) (Color index part 1: Solvent red 19) (Color index part 2: 26 050) (fat- and oil-soluble dye component) | 25.00 parts |
| Helizarinblue BT Conc. (copperphthalocyaninblue) (Color index part 1: Pigment blue 15) (Color index part 2: 74 160) (fat- and oil-insoluble dye component) | 75.00 parts |

The color of this mixture is violet.

The finished material was inserted in a vapor-exhaust hood and exposed to an oil aerosol from a frying pan. On being contacted by oil, the grid imprint took on a red coloration which on further loading with a total of 150 g/m$^2$ of oil spread to the unprinted spaces between the lines and clearly marked the originally uncolored squares.

For fire-safety and sanitary reasons, the loading was held at a level corresponding to one to three months' use, depending on cooking practice.

EXAMPLE 2

The nonwoven fabric in accordance with Example 1 was imprinted with a grid of dotted lines, the dots having a diameter of 1 mm and being spaced 2 mm apart, and the grid spacing being 5 mm. The print paste was as in Example 1 except that the dye mixture had the following composition by weight:

| | |
|---|---|
| (b) Sudanblue II or Ceresblue (Anthraquinone dye) (Color index part 1: Solvent blue 35) (Color index part 2: 61 554) (fat- and oil-soluble dye component) | 25.00 parts |
| Helizaringreen BT conc. (copperphthalocyaningreen) (Color index part 1: Pigment green 7) (Color index part 2: 74 260) (fat- and oil-insoluble dye component) | 75.00 parts |

The color of this mixture is blue-green.

After the finished filter mat had been loaded with about 50 g/m² of an oil-fat aerosol, the spaces between the lines turned light blue.

EXAMPLE 3

Two sets of parallel lines spaced 35 mm apart were imprinted at an angle of 45° to form a diamond grid on one side of a filter mat having a weight of 300 g/m² and a thickness of 20 mm, and consisting entirely of 3.3 dtex, 40 mm acetone-soluble cellulose acetate staple fiber, the mat being strengthened without the use of bonding agent by heat welding of the fiber intersections, and having a permeability to air pursuant to DIN 53,887 of 670 l/s×m², measured at a pressure difference of 0.5 mbar. The lines were formed of individual dots of a diameter of 1 mm. The dye mixture used for the imprint consisted of 20% of a fat- and oil-soluble component of an orange color and 80% of a fat- and oil-insoluble component of black color.

The finished printed pattern was black.

After the imprinted material had been exposed to an oil aerosol and loaded with about 600 g/m² of oil and fat, it exhibited a uniform coloration of the originally white area of the color of the fat-soluble dye component, orange.

EXAMPLE 4

The nonwoven fabric in accordance with Example 1 was imprinted over the area on the intake side with a print paste as in Example 1 except that the dye mixture had the following composition by weight:

| | |
|---|---|
| (c) Sudanblue II or Ceresblue (Anthraquinone dye) (Color index part 1: Solvent blue 35) (Color index part 2: 61 554) (fat- and oil-soluble dye component) | 20.00 parts |
| Helizarinred BT (Azopigment) (Color index part 1: Pigment red 170) (Color index part 2: 12 475) (fat- and oil-insoluble component) | 80.00 parts |

The color of this mixture is violet.

The finished material was inserted in a vapor-exhaust hood and exposed to an oil aerosol from a frying pan. With an oil load of 300 g/m², the imprint took on a bright-blue coloration which contrasted markedly with the original color, thus giving a signal.

The filter mat in accordance with the invention thus offers the advantage that when used in kitchen hoods it will without further technical measures indicate the actual condition of the filter mat even to an untrained user. Determination of the proper time for filter replacement is thus assured.

It will be appreciated that the instant specification and examples are set forth by way of illustration and not limitation, and that various modifications and changes may be made without departing from the spirit and scope of the present invention.

What is claimed is:

1. A fibrous filter mat in combination with a filter hood, the mat being printed on only its intake surface with a mixture of at least two dye components which are insoluble in one another, one of the dye components being oil soluble and another being oil-insoluble, the dye components contrasting in color from each other and from the fiber.

2. A filter mat according to claim 1, wherein the dye component mixture is printed in the form of dots and/or lines of a width of about 0.5 to 2 mm.

3. A filter mat according to claim 1, wherein the dye component mixture is printed in a striped or checkered pattern in which the parallel lines are spaced about 5 to 40 mm apart.

4. A filter mat according to claim 1, wherein the dye component mixture is printed in a striped or checkered pattern in which the parallel lines are spaced about 20 mm apart.

5. A filter mat according to claim 1, wherein the dye component mixture is printed in the form of written words or figures.

6. A filter mat according to claim 1, wherein the dye component mixture contains a size and/or bonding agent.

* * * * *